United States Patent [19]

Kasai et al.

[11] Patent Number: 4,483,845

[45] Date of Patent: Nov. 20, 1984

[54] PROCESS FOR PRODUCING ARSENOUS ACID

[75] Inventors: Shunichi Kasai, Ibaragi; Takashi Ogata, Saitama; Teruo Tamanoi; Hiroshi Hosaka, both of Saitama, all of Japan

[73] Assignee: Nippon Mining Co., Ltd., Tokyo, Japan

[21] Appl. No.: 427,346

[22] Filed: Sep. 29, 1982

[30] Foreign Application Priority Data

Oct. 2, 1981 [JP] Japan .................................. 56-156201

[51] Int. Cl.$^3$ ............................................. C01B 27/00
[52] U.S. Cl. ...................................... 423/617; 423/87
[58] Field of Search .................................. 423/87, 617

[56] References Cited

U.S. PATENT DOCUMENTS 1,952,290  3/1934  Schopper ............................ 423/617
4,061,564  12/1977  De Schepper et al. .............. 423/87
4,102,976  7/1978  Hiemeleers et al. .................. 423/87

*Primary Examiner*—John Doll
*Assistant Examiner*—Wayne A. Langel
*Attorney, Agent, or Firm*—Sughrue, Mion, Zinn, Macpeak, and Seas

[57] ABSTRACT

A process for producing arsenous acid is disclosed. The reactants include an organic solvent containing 5 valent arsenic, a reducing agent and an additional component selected from the group consisting of water and an aqueous solution. The organic solvent containing 5 valent arsenic contacts and reacts with the reducing agent in the presence of the water or aqueous solution in order to directly produce arsenous acid from the organic solvent containing 5 valent arsenic. The process is a simple and economical process for producing arsenous acid.

4 Claims, No Drawings

PROCESS FOR PRODUCING ARSENOUS ACID

FIELD OF THE INVENTION

The present invention relates to a process for producing arsenous acid from an organic solvent containing arsenic. More particularly, the invention relates to a process for producing arsenous acid directly from an organic solvent containing extracted 5 valent arsenic while applying a solvent extraction process as the process for separating and recovering 5 valent arsenic from an aqueous solution containing arsenic.

BACKGROUND OF THE INVENTION

A solvent extraction process is one of the known processes for separating and recovering arsenic from an aqueous solution containing 5 valent arsenic (hereinafter, referred to as arsenic). Examples of the extracted include tributyl phosphate (TBP), trioctyl phosphate (TOP), dibutyl butyl phosphonate (DBBP), and di-2-ethylhexyl 2-ethylhexyl phosphonate.

The above described extractant is used alone or, if necessary, as a mixture thereof with a diluent such as mineral oil, etc., or with another extractant, as the so-called organic solvent.

Arsenic extracted with such organic solvents is generally subjected to stripping with acid, alkali or water, etc., and the arsenic in the solution after the stripping is recovered as arsenous acid by condensation or reduction.

One known process is a solvent extraction process for producing arsenic using TBP as an exrtractant for the arsenic containing sulfuric acid solution. This process comprises using a large amount of water for washing sulfuric acid in the arsenic containing solvent in a scrubbing step before stripping of arsenic from the arsenic containing solvent, thereafter carrying out multistage stripping of arsenic with water, heating the resulting solution after the stripping to evaporate water, by which arsenic is condensed, and blowing a sulfurous acid gas as the reducing agent through the condensed arsenic solution to crystallize arsenous acid. This process has many problems. For example, it has many complicated steps and it is very difficult to maintain the water balance due to the use of a large amount of water for washing or stripping. Furthermore, a great deal of energy is required for evaporating a large amount of water.

The present inventors have investigated possible solutions of the above described problems. As a result of these investigations, the inventors have found that arsenic acid is directly formed by bringing the arsenic containing organic solvent into contact with a reducing agent and water or an aqueous solution.

SUMMARY OF THE INVENTION

A primary object of the present invention is to provide a process for recovering arsenic by solvent extraction.

Another object is to provide such a process which includes simple steps.

Yet another object is to provide such a process whereby arsenous acid is economically produced.

Still another object is to provide a process which may be carried out without requiring careful maintenance of the water balance.

The present invention relates to a process for producing arsenous acid which comprises bringing an organic solvent containing 5 valent arsenic into contact with a reducing agent and water or an aqueous solution to crystallize arsenous acid directly from the organic solvent.

DETAILED DESCRIPTION OF THE INVENTION

In the following, the present invention is illustrated in detail.

The present invention is applied to the treatment of organic solvents containing arsenic in a 5 valent form which are obtained by extracting arsenic from various processing products, for example, flue dust, precipitates formed electrolytically in a removing step of copper and arsenic, or electrolyte waste liquor.

The organic solvent is composed of only the extractant or of a mixture of the extractant and a diluent. TBP is generally used as the extractant.

However, the extractant is not limited to TBP. For example, extractants such as TOP, DBBP, or di-2-ethylhexyl 2-ethylhexyl phosphonate, may be used in the present invention. Of these, TOP and DBBP are preferred.

Further, as the diluent, mineral oils or those to which alcohols (e.g., tridecyl alcohol), etc. is added as a modifier are used.

Examples of useful reducing agents include sulfurous acid gas, sodium sulfite and sodium thiosulfite. With respect to the reuseability of the agent and aqueous solution after recovery of arsenous acid, sulfurous acid gas is preferably used.

The amount of the reducing agent used varies depending upon the concentration of 5 valent arsenic and the extractant in the organic solvent after the 5 valent arsenic has been extracted, the volume ratio of the organic solvent to the aqueous solution and the reaction temperature. If $SO_2$ gas is used as the reducing agent, the partial pressure of $SO_2$ gas ($P_{SO_2}$) also influences the amount of the reagent required.

For example, when 240 ml of an organic solvent comprising undiluted TBP and containing 32 g/l of 5 valent arsenic is brought into contact with 80 ml of an aqueous solution containing 9.2 g/l of 3 valent arsenic and 293 g/l of sulfuric acid, the amount of $SO_2$ gas used is about 82 g under 0.02 kg/cm²G of $P_{SO_2}$ at 25° C. Of the 82 g of $SO_2$ gas, about 7 g of $SO_2$ is used for reducing 5 valent arsenic to 3 valent arsenic, and about 4 g of $SO_2$ is dissolved in the aqueous solution, with the rest (i.e., about 71 g of $SO_2$) being dissolved in the organic solvent.

When the reducing agent is $SO_2$, the $SO_2$ remains in the organic phase after the reaction. However, the $SO_2$ in the organic phase can be easily recovered by suction or by rising the temperature, etc. so that it may be reused.

A reactor is used for bringing the above described arsenic containing organic solvent into contact with the reducing agent. It is possible to use any of the open type or closed type reactors. When using a gaseous reducing agent such as a sulfurous acid gas, the closed type reactor is preferably used in order to increase the partial pressure so as to increase the reducing rate and in order to recover the sulfurous acid gas so that it can be reused.

In the present invention, when the arsenic containing organic solvent (which is stirred in the reactor) is brought into contact with only the reducing agent, it is difficult to sufficiently obtain arsenous acid as shown in Comparative Examples 1 and 2. Accordingly, it is important to add a small amount of water or an aqueous solution when the reducing agent is brought into contact with the arsenic containing organic solvent in order to greatly accelerate the formation of arsenous acid. In general, there are not particular limitations with respect to the volume ratio of solvent to water, but it is desired that the ratio ranges from 50/1 to 1/2, preferably from 8/1 to 2/1 (O/A, organic solvent/water) in order to reduce the amount of liquid to be treated.

The reaction may be carried out in the temperature range from 0° C. to 200° C. Keeping the temperature higher brings shortening the reaction time. However, it is the most preferable to carry out the reaction at room temperature because of keeping the energy cost low.

It is not easy to determine the reaction time because it depends upon factors such as the type and amount of reducing agent, the partial pressure when using a gaseous reducing agent and the volume ratio of water to organic solvent.

For example, when the reaction is carried out with the addition of water and with the use of a sulfurous acid gas as the reducing agent, the reaction completes within about 3 hours under an atmospheric pressure and within 1 to 2 hours under an increased pressure as shown in Examples 1 to 3.

A number of advantages of the present invention will become apparent to those skilled in the art upon reading this disclosure. For example, the process of the present invention is shortened and simplified as compared with prior processes and the water balance can be easily maintained without using a large amount of water. Further, consumption of energy can be greatly reduced.

In the following, the present invention is illustrated in greater detail with reference to examples. However, the present invention is not limited to these examples.

EXAMPLE 1

An aqueous solution containing 64.4 g/l of As (V) and 260 g/l of $H_2SO_4$ was brought into contact with an organic solvent composed of 100% of TBP to extract As (V). Thus, an organic solvent containing 32.1 g/l of As (V) was obtained, which was used as a sample.

240 ml of the above described arsenic containing organic solvent and 80 ml of a reducing solution containing 7.49 g/l of As and 300 g/l of $H_2SO_4$ were put in a closed type vessel (a glass cylindric vessel, the opening of which was sealed by a rubber plug) (hereinafter, the same vessel). A $SO_2$ gas was introduced under stirring to carry out the reaction for 3 hours under a $SO_2$ partial pressure of 0.01 kg/cm$^2$G at a temperature of 25° C.

After the reaction, the solid and the liquid were separated and analyzed respectively. Further, the reaction product was identified by X-ray diffraction. As a result, 9.91 g of 99.5% arsenous anhydride ($As_2O_3$) was obtained. Other results are shown in Table 1.

EXAMPLE 2

An aqueous solution containing 46 g/l of As (V) and 510 g/l of $H_2SO_4$ was brought into contact with an organic solvent composed of 60% of TBP, 5% of tridecyl alcohol and 35% of kerosine to obtain an organic solvent containing 13.2 g/l of As (V), which was used as a sample.

400 ml of the above described arsenic containing organic solvent to which 50 ml of water was added was put in the same closed type vessel as in Example 1. A $SO_2$ gas was introduced under stirring to carry out the reaction for 2 hours under a $SO_2$ partial pressure of 0.01 kg/cm$^2$G at a temperature of 35° C. As a result, 5.77 g of arsenous anhydride was obtained. The results are shown in Table 1.

EXAMPLE 3

400 ml of the same arsenic containing organic solvent as in Example 2 was used as a sample, to which 50 ml of water was added. The resulting mixture was put in an autoclave (volume: 2 liters). A $SO_2$ was introduced with stirring to carry out the reaction for 3 hours under a $SO_2$ partial pressure of 1.0 kg/cm$^2$G at a temperature of 95° C. When the reaction product was analyzed, 4.53 g of arsenous anhydride was formed. The results are shown in Table 1.

COMPARATIVE EXAMPLE 1

(No addition of water)

240 ml of the same arsenic containing organic solvent as in Example 1 was put in the closed type vessel. A $SO_2$ gas was introduced thereinto to carry out the reaction for 3 hours under a $SO_2$ partial pressure of 0.01 kg/cm$^2$G at a temperature of 25° C.

As a result, 4 ml of aqueous solution was stripped from the organic phase and 0.65 g of arsenic anhydride crystal was obtained. The results are shown in the following table.

COMPARATIVE EXAMPLE 2

(No addition of water)

400 ml of the same arsenic containing organic solvent as in Example 2 was put in the same autoclave as in Example 3. A $SO_2$ gas was introduced under stirring to carry out the reaction for 1 hour under a $SO_2$ partial pressure of 1.0 kg/cm$^2$G at a temperature of 95° C. The test was compared with the case of adding water.

One hour later, the contents were taken out of the autoclave, and solid-liquid separation was carried out to obtain 0.55 g of arsenous anhydride. The results are shown in the following table.

TABLE 1

| | Condition of Reaction | | | | | Result of Reaction | | | | Distribution of As (%) |
|---|---|---|---|---|---|---|---|---|---|---|
| | Vessel | $P_{SO_2}$ (kg/cm$^2$G) | Temp. (°C.) | Reaction Time (Hr) | Vol. of Org. (ml) | Vol. of Aq. (ml) | Product | Amount (ml, g) | As Content (g/l, %) | |
| Example 1 | Closed Type | 0.01 | 25 | 3 | 240 (TBP 100%) | | Org. solvent | 282 ml | 0.65 g/l | 2.38 |
| | | | | | | | $As_2O_3$ | 9.91 g | 75.35% | 97.35 |
| | | | | | | | Aq. solution | 99 ml | 7.04 g/l | 0.26 |
| Example 2 | Closed Type | 0.01 | 35 | 2 | 400 (TBP 60%) | | Org. solvent | 420 ml | 0.64 g/l | 5.1 |
| | | | | | | | $As_2O_3$ | 5.77 g | 67.9% | 74.2 |
| | | | | | | | Aq. solution | 55 ml | 19.04 g/l | 20.2 |
| Example 3 | Autoclave | 1.0 | 95 | 1 | 400 (TBP 60%) | 50 | Org. solvent | 375 ml | 3.38 g/l | 24.0 |
| | | | | | | | $As_2O_3$ | 4.53 g | 72.5% | 62.2 |

TABLE 1-continued

| | Condition of Reaction | | | | | Result of Reaction | | | |
|---|---|---|---|---|---|---|---|---|---|
| | Vessel | Pso$_2$ (kg/cm$^2$G) | Temp. (°C.) | Reaction Time (Hr) | Vol. of Org. (ml) | Vol. of Aq. (ml) | Product | Amount (ml, g) | As Content (g/l, %) | Distribution of As (%) |
| Comparative Example 1 | Closed Type | 0.01 | 25 | 3 | 240 (TBP 60%) | 80 | Aq. solution | 42 ml | 16.50 g/l | 13.2 |
| | | | | | | | Org. solvent | 280 ml | 25.4 g/l | 92.24 |
| | | | | | | | As$_2$O$_3$ | 0.65 g | 74.5% | 6.28 |
| Comparative Example 2 | Autoclave | 1.0 | 95 | 1 | 400 (TBP 60%) | 50 | Aq. solution | 4.0 ml | 28.5 g/l | 1.50 |
| | | | | | | | Org. solvent | 416 ml | 11.6 g/l | 91.41 |
| | | | | | | | As$_2$O$_3$ | 0.55 g | 73.5% | 7.65 |
| | | | | | | | Aq. solution | 1.6 ml | 30.6 g/l | 0.95 |

(Absolute pressure of SO$_2$ partial pressure) = (Atmospheric pressure) − (Water vapor pressure) + (Gauge pressure of partial pressure)

While the invention has been described in detail and with reference to specific embodiment thereof, it will be apparent to one skilled in the art that various changes and modifications can be made therein without departing from the spirit and scope thereof.

What is claimed is:

1. A process for producing arsenous acid which comprises bringing an organic solvent containing 5 valent arsenic into contact with a reducing agent and in the presence of water or an aqueous solution to produce arsenous acid directly from said organic solvent, the volume ratio of organic solvent containing 5 valent arsenic to water being in the range of from 50/1 to 1/2.

2. A process for producing arsenous acid, as claimed in claim 1, wherein the organic solvent contains tributyl phosphate or dibutyl butyl phosphonate.

3. A process for producing arsenous acid, as claimed in claim 1, wherein the reducing agent is selected from the group consisting of sulfurous acid gas, sodium sulfite and sodium thiosulfite.

4. A process for producing arsenous acid, as claimed in claim 1, wherein the reaction is carried out at a temperature of from 0° C. to 200° C.

* * * * *